(12) United States Patent
Liu et al.

(10) Patent No.: US 10,884,561 B2
(45) Date of Patent: Jan. 5, 2021

(54) TOUCH SUBSTRATE, METHOD THEREOF FOR POSITIONING A TOUCH, AND CAPACITIVE TOUCH SCREEN

(71) Applicants: Beijing BOE Optoelectronics Technology Co., Ltd., Beijing (CN); BOE Technology Group Co., Ltd., Beijing (CN)

(72) Inventors: Jinxing Liu, Beijing (CN); Bo Gao, Beijing (CN); Bo Liu, Beijing (CN); Yafei Li, Beijing (CN); Wenjia Sun, Beijing (CN); Wenchao Han, Beijing (CN); Xiaoyang Shen, Beijing (CN); Meiling Jin, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/412,887

(22) Filed: May 15, 2019

(65) Prior Publication Data

US 2019/0369809 A1    Dec. 5, 2019

(30) Foreign Application Priority Data

Jun. 5, 2018 (CN) .......................... 2018 1 0582361

(51) Int. Cl.
*G06F 3/044* (2006.01)
*G06F 3/041* (2006.01)
*G06F 3/047* (2006.01)

(52) U.S. Cl.
CPC ............ *G06F 3/0443* (2019.05); *G06F 3/047* (2013.01); *G06F 3/0414* (2013.01)

(58) Field of Classification Search
CPC ...... G06F 3/0443; G06F 3/0414; G06F 3/047; G06F 3/04164; G06F 3/0446; G06F 3/041662; G06F 3/0416; G06F 3/044
See application file for complete search history.

(56) References Cited

U.S. PATENT DOCUMENTS

| | | | |
|---|---|---|---|
| 9,454,267 B2* | 9/2016 | Ho | G06F 3/044 |
| 10,025,428 B2* | 7/2018 | Khazeni | G06F 3/0418 |
| 2007/0242054 A1* | 10/2007 | Chang | G06F 3/044 |
| | | | 345/173 |
| 2008/0150906 A1* | 6/2008 | Grivna | G06F 3/0416 |
| | | | 345/173 |

(Continued)

*Primary Examiner* — Benyam Ketema
(74) *Attorney, Agent, or Firm* — Arent Fox LLP; Michael Feinberg

(57) ABSTRACT

The disclosure discloses a touch substrate, a method thereof for positioning a touch, and a capacitive touch screen, and the touch substrate includes a base substrate and a plurality of separate touch electrodes arranged in a single layer on the base substrate, where the touch electrodes include first touch electrodes and second touch electrodes, arranged alternately in both a first direction and a second direction, and respective first touch electrodes in each of at least one row or column of the touch electrodes are connected through one same wire, or respective second touch electrodes in each of at least one row or column of the touch electrodes are connected through one same wire.

20 Claims, 21 Drawing Sheets

(56) References Cited

U.S. PATENT DOCUMENTS

| | | | |
|---|---|---|---|
| 2009/0277695 A1* | 11/2009 | Liu | G06F 3/044 |
| | | | 178/18.03 |
| 2010/0090979 A1* | 4/2010 | Bae | G06F 3/044 |
| | | | 345/174 |
| 2010/0321326 A1* | 12/2010 | Grunthaner | G06F 3/044 |
| | | | 345/174 |
| 2016/0041666 A1* | 2/2016 | Lee | G02F 1/13338 |
| | | | 345/174 |

* cited by examiner

TOUCH SUBSTRATE, METHOD THEREOF FOR POSITIONING A TOUCH, AND CAPACITIVE TOUCH SCREEN

CROSS-REFERENCE TO RELATED APPLICATION

This Application claims priority to Chinese Patent Application No. 201810582361.X, filed on Jun. 5, 2018, the content of which is incorporated by reference in the entirety.

FIELD

This disclosure relates to the field of touch display technologies, and particularly to a touch substrate, a method thereof for positioning a touch, and a capacitive touch screen.

DESCRIPTION OF THE RELATED ART

Touch screens are widely applied input devices for sensing a touch, and the touch screens in the related art include resistive, capacitive, surface-infrared touch screens, etc., according to their touch sensing principles. Particularly, the capacitive touch screen is popularly favored due to its high transmittance, abrasion resistance, heat resistance, humidity resistance, long service life, multi-point touch and other sophisticated functions, etc.

SUMMARY

The embodiments of the disclosure provide a touch substrate, a method thereof for positioning a touch, and a capacitive touch screen.

In an aspect, the embodiments of the disclosure provide a touch substrate including a base substrate; and a plurality of touch electrodes, arranged in a single layer and separated from each other on the base substrate; wherein the plurality of touch electrodes include first touch electrodes and second touch electrodes, arranged alternately in both a first direction and a second direction; and respective first touch electrodes in each of at least one row or column of the plurality of touch electrodes are connected through one same wire, or respective second touch electrodes in each of at least one row or column of the plurality of touch electrodes are connected through one same wire.

In some embodiments, respective first touch electrodes in each column of the plurality of touch electrodes are connected with one same first wire extending in a column direction; and respective second touch electrodes in each row of the plurality of touch electrodes are connected with one same second wire extending in a row direction, and further connected with one same third wire extending in the column direction subsequently.

In some embodiments, respective first touch electrodes in each column of the plurality of touch electrodes are connected with one same first wire extending in a column direction; and respective second touch electrodes in each row of the plurality of touch electrodes are connected with fourth wires extending in the column direction in a one-to-one manner, and further connected with one same fifth wire extending in a row direction subsequently.

In some embodiments, respective first touch electrodes in each row of the plurality of touch electrodes are connected with one same second wire extending in a row direction, and further connected with one same third wire extending in a column direction subsequently; and respective second touch electrodes in each row of the plurality of touch electrodes are connected respectively with first wires extending in the column direction in a one-to-one manner.

In some embodiments, respective first touch electrodes in each row of the plurality of touch electrodes are connected with one same second wire extending in a row direction, and further connected with one same third wire extending in a column direction subsequently; and respective second touch electrodes in each column of the plurality of touch electrodes are connected with one same first wire extending in the column direction.

In some embodiments, respective first touch electrodes in each column of the plurality of touch electrodes are connected respectively with first wires extending in a column direction in a one-to-one manner; and respective second touch electrodes in each row of the plurality of touch electrodes are connected with one same second wire extending in a row direction, and further connected with one same third wire extending in the column direction subsequently.

In some embodiments, each of the plurality of touch electrodes is connected with a corresponding wire through at least one connection point.

In some embodiments, each of the plurality of touch electrodes is in a shape of a diamond with diagonals extending respectively in a row direction and a column direction, and the first direction and the second direction are extension directions of two adjacent sides of the diamond.

In some embodiments, the touch substrate includes a blank area around an area where the plurality of touch electrodes are located; and a compensation electrode is arranged in the blank area to sense a touch in the blank area.

In some embodiments, the compensation electrode is in a shape of a triangle matching with the plurality of touch electrodes.

In some embodiments, each of the plurality of touch electrodes is in a shape of a square with two adjacent sides extending respectively in a row direction and a column direction, and the first direction and the second direction in which the first touch electrodes and the second touch electrodes are alternately arranged are the row direction and the column direction, respectively.

In some embodiments, each first touch electrode includes a plurality of first sub-touch electrodes electrically connected with each other; each second touch electrode includes a plurality of second sub-touch electrodes electrically connected with each other; and the plurality of first sub-touch electrodes and the plurality of second sub-touch electrodes are arranged alternately in both a row direction and a column direction.

In some embodiments, shapes of each of the plurality of first sub-touch electrodes and each of the plurality of second sub-touch electrodes are squares of 1 mm*1 mm.

In some embodiments, the touch substrate further includes gate lines and data lines arranged intersecting with and insulated from each other; and both the first wire and the third wire are arranged at a same layer as the data lines, and the second wire is arranged at a same layer as the gate lines or the plurality of touch electrodes.

In some embodiments, the touch substrate further includes gate lines and data lines arranged intersecting with and insulated from each other; and both the first wire and the fourth wires are arranged at a same layer as the data lines, and the fifth wire is arranged at a same layer as the gate lines.

In another aspect, the embodiments of the disclosure further provide a capacitive touch screen, including the touch substrate above according to the embodiments of the disclosure.

In yet another aspect, the embodiments of the disclosure further provide a method for positioning a touch in the touch substrate above according to the embodiments of the disclosure, the method including: inputting a first frequency detection signal for detecting a self-capacitance to respective touch electrodes in the touch substrate in a scan order, and inputting a second frequency detection signal for detecting a mutual-capacitance to respective first touch electrodes or respective second touch electrodes; and receiving feedback signals of the respective touch electrodes transmitted through wires, and determining a touch position according to the feedback signals.

In some embodiments, determining the touch position according to the feedback signals includes: demodulating the feedback signals, and determining self-capacitances and mutual-capacitances of the respective touch electrodes; comparing the self-capacitances of the respective touch electrodes at respective positions with a first preset capacitance, and the mutual-capacitances thereof with a second preset capacitance; and determining a position of a touch electrode with a self-capacitance greater than the first preset capacitance, and a mutual-capacitance lower than the second preset capacitance as a touch position.

In some embodiments, determining the self-capacitances and the mutual-capacitances of the respective touch electrodes includes: determining self-capacitances and mutual-capacitances of respective first sub-touch electrodes of the respective first touch electrodes, and respective second sub-touch electrodes of the respective second touch electrodes.

In some embodiments, determining the position of the touch electrode with a self-capacitance greater than the first preset capacitance, and a mutual-capacitance lower than the second preset capacitance as the touch position includes: determining an area including a first touch electrode corresponding to a first sub-touch electrode with a self-capacitance greater than the first preset capacitance, and a mutual-capacitance lower than the second preset capacitance, or an area including a second touch electrode corresponding to a second sub-touch electrode with a self-capacitance greater than the first preset capacitance, and a mutual-capacitance lower than the second preset capacitance as the touch position.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

A capacitive touch screen in the related art includes a plurality of touch electrodes arranged at a same layer, wires connected with the plurality of touch electrodes in a one-to-one manner, and a touch chip connected with the plurality of touch electrodes through the wires to detect a touch position. In order to guarantee the precision of a touch, generally a large number of touch electrodes are arranged, and correspondingly there are also a large number of wires, and thus a large number of touch pins (Tx pins) in the touch chip, which are to be connected with the wires, so a large area is occupied by the touch chip.

In view of this, the embodiments of the disclosure provide a touch substrate, a method thereof for positioning a touch, and a capacitive touch screen to reduce the area occupied by the touch chip.

Implementations of the touch substrate, the method thereof for positioning a touch, and the capacitive touch screen according to the embodiments of the disclosure will be described below in details with reference to the drawings. It shall be noted that, the embodiments to be described in this specification are only a part but not all of the embodiments of the disclosure; and the embodiments of the disclosure, and features in the embodiments can be combined with each other unless they conflict with each other. Moreover, based upon the embodiments here of the disclosure, all the other embodiments which can occur to those ordinarily skilled in the art without any inventive effort shall fall into the claimed scope of the disclosure.

Figure 1:
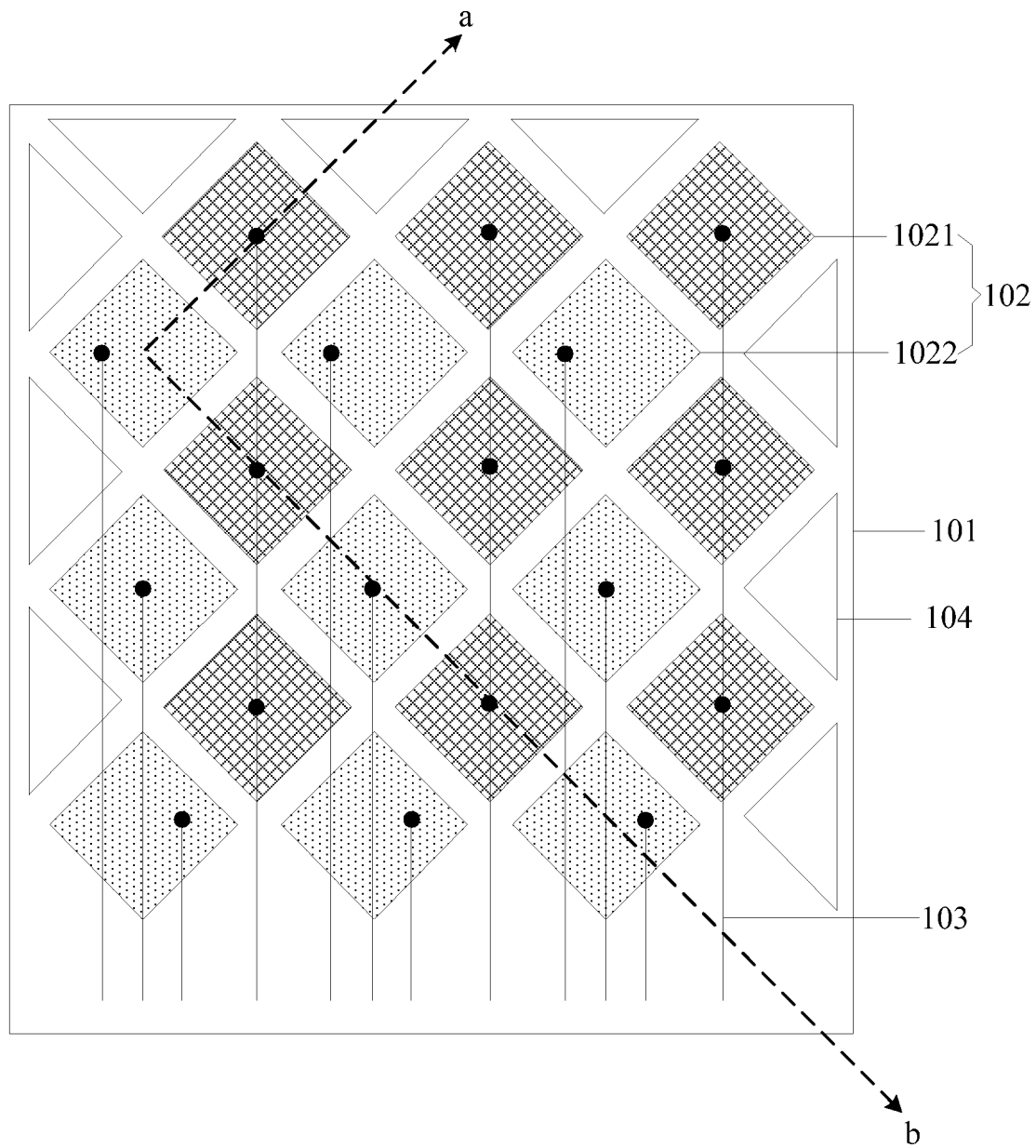
FIG. 1 to FIG. 7 are schematic structural diagrams respectively of a touch substrate according to the embodiments of the disclosure.

As illustrated in FIG. 1, a touch substrate according to the embodiments of the disclosure includes: a base substrate 101 and a plurality of touch electrodes 102 arranged in a single layer and separated from each other on the base substrate 101, where the touch electrodes 102 include first touch electrodes 1021 and second touch electrodes 1022, arranged alternately in both a first direction a and a second direction b; where first touch electrodes 1021 in each of at least one row or column of the touch electrodes are connected through one same wire 103, or second touch electrodes 1022 in each of at least one row or column of the touch electrodes are connected through one same wire 103. As illustrated in FIG. 1, for example, each column of first touch electrodes 1021 are connected through one same wire 103 and respective second touch electrodes 1022 are connected with different wires 103 in a one-to-one manner.

Unlike the related art in which one touch electrode 102 is connected with one wire 103 in a one-to-one manner, first touch electrodes 1021 in each of at least one row or column of the touch electrodes, or second touch electrodes 1022 in each of at least one row or column of the touch electrodes are connected through one same wire 103 in the embodiments of the disclosure, so as compared with the related art, in the embodiments of the disclosure, the number of wires 103 can be reduced, and since the wires 103 correspond to touch pins in a touch chip in a one-to-one manner, and the number of wires is the same as the number of touch pins, the number of touch pins can also be reduced to thereby reduce an area occupied by the touch chip. Furthermore, in the touch substrate according to the embodiments of the disclosure, a touch can be detected under both the self-capacitance principle and the mutual-capacitance principle, thus resulting in a better anti-interference effect, and also addressing effectively the problem in the touch substrate of the related art that if there is a water drop falling down, then a touch may be misjudged, and the touch substrate may not be water-proof.

In the touch substrate above according to the embodiments of the disclosure, the first touch electrodes 1021 and the second touch electrodes 1022 can be connected with the wires 103 in the following six other possible implementations than the implementation as illustrated in FIG. 1.

Figure 2:
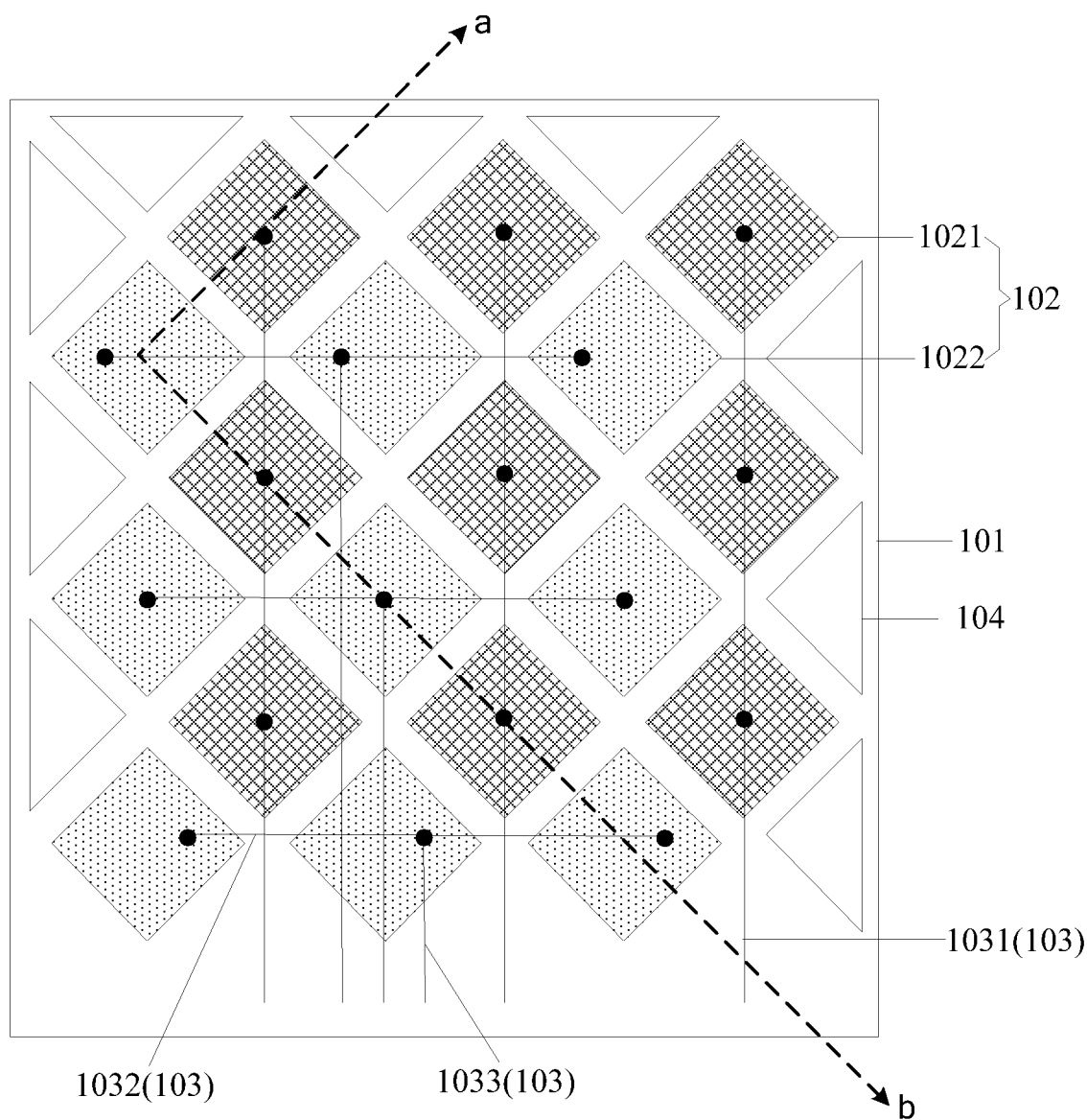

In a first possible implementation as illustrated in FIG. 2, each column of first touch electrodes 1021 are connected with one same first wire 1031 extending in a column direction; and each row of second touch electrodes 1022 are connected with one same second wire 1032 extending in a row direction, and then connected with one same third wire 1033 extending in the column direction.

As can be appreciated, the first wires 1031 and the third wires 1033 are connected respectively with touch pins in the touch chip in a one-to-one manner in a practical implementation.

Figure 3:
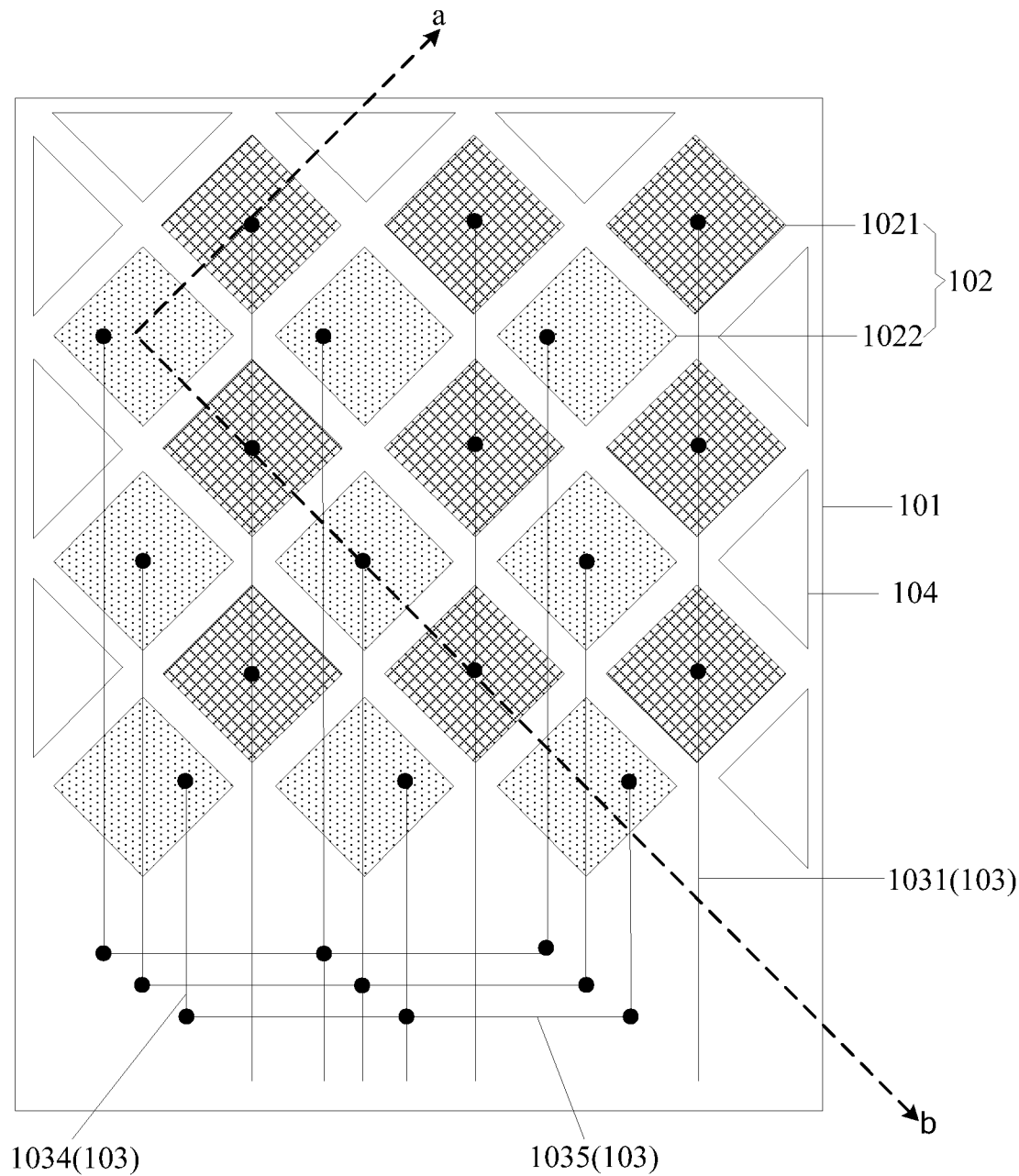

In a second possible implementation as illustrated in FIG. 3, each column of first touch electrodes 1021 are connected with one same first wire 1031 extending in the column direction; and each row of second touch electrodes 1022 are connected with fourth wires 1034 extending in the column direction in a one-to-one manner, and then connected with one same fifth wire 1035 extending in the row direction.

It shall be noted that, the first wires 1031 and the fifth wires 1035 are connected respectively with touch pins in the touch chip in a one-to-one manner in a practical implementation.

Figure 4:
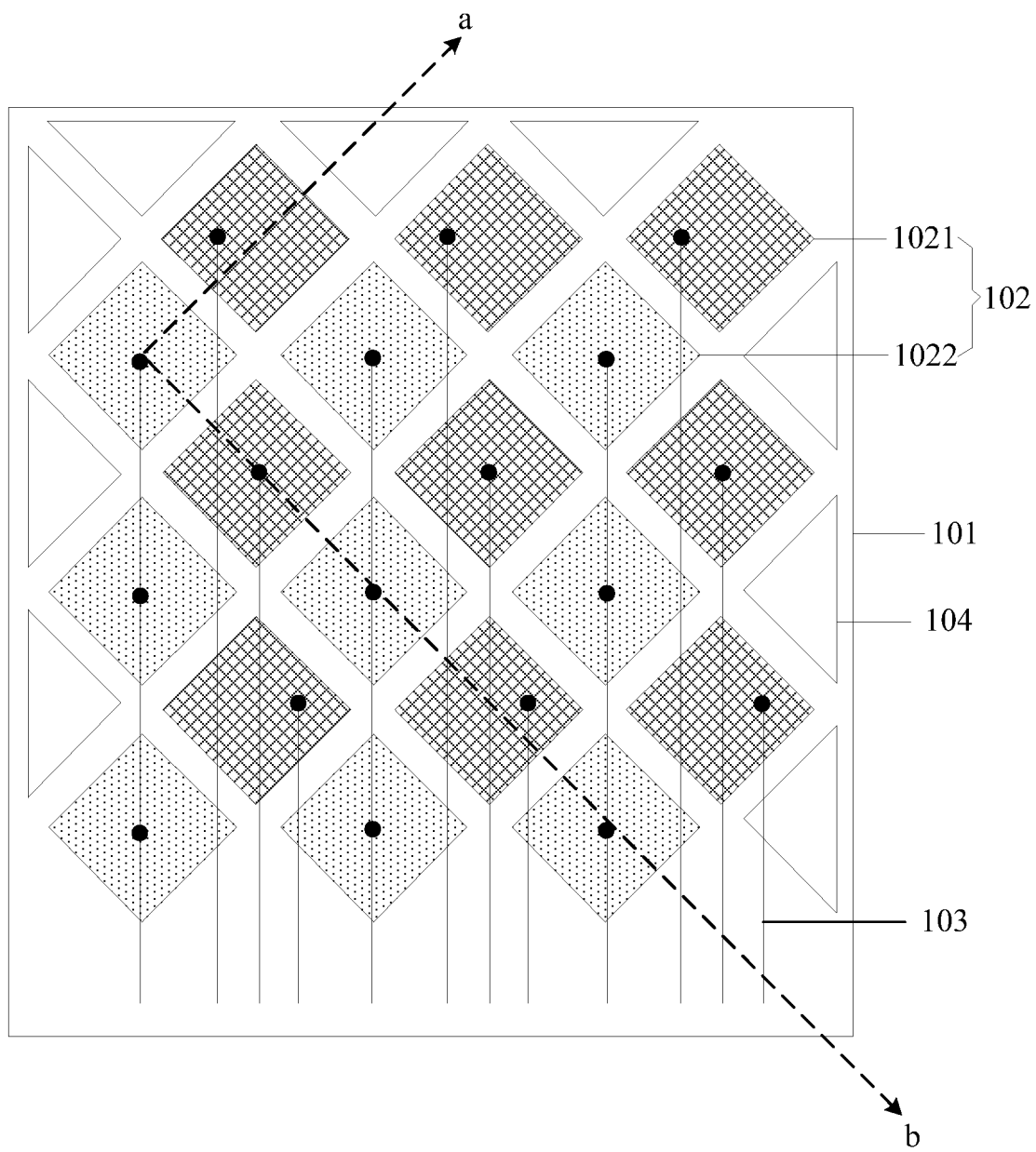

In a third possible implementation as illustrated in FIG. 4, each first touch electrode 1021 is connected with one wire 103 extending in the column direction in a one-to-one manner; and each column of second touch electrodes 1022 are connected through one same wire 103 extending in the column direction.

It shall be noted that, the wires 103 are connected respectively with touch pins in the touch chip in a one-to-one manner in a practical implementation.

Figure 5:
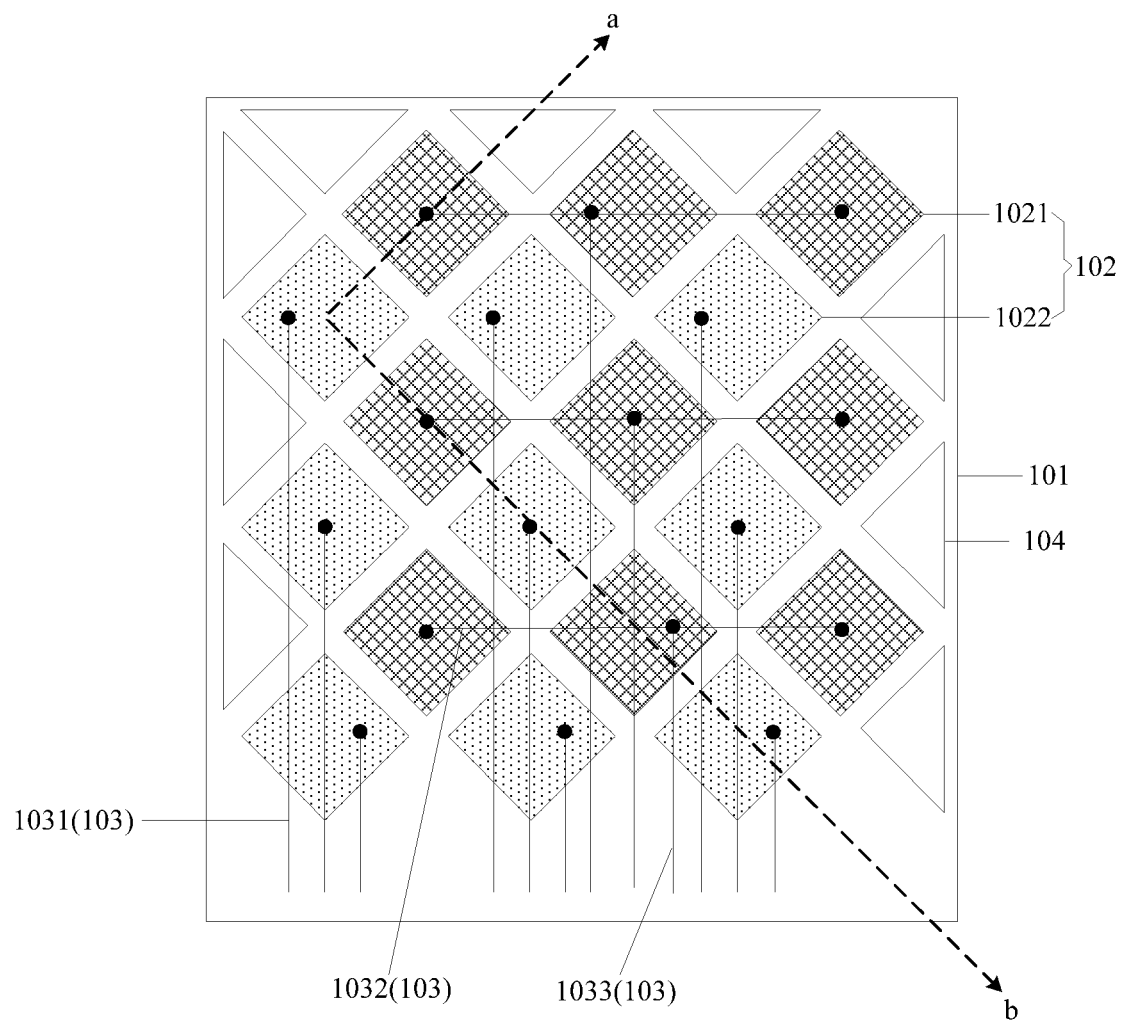

In a fourth possible implementation as illustrated in FIG. 5, each row of first touch electrodes 1021 are connected with one same second wire 1032 extending in the row direction, and then connected with one same third wire 1033 extending in the column direction; and each row of second touch electrodes 1022 are connected respectively with first wires 1031 extending in the column direction in a one-to-one manner.

It shall be noted that, the first wires 1031 and the third wires 1033 are connected respectively with touch pins in the touch chip in a one-to-one manner in a practical implementation.

Figure 6:
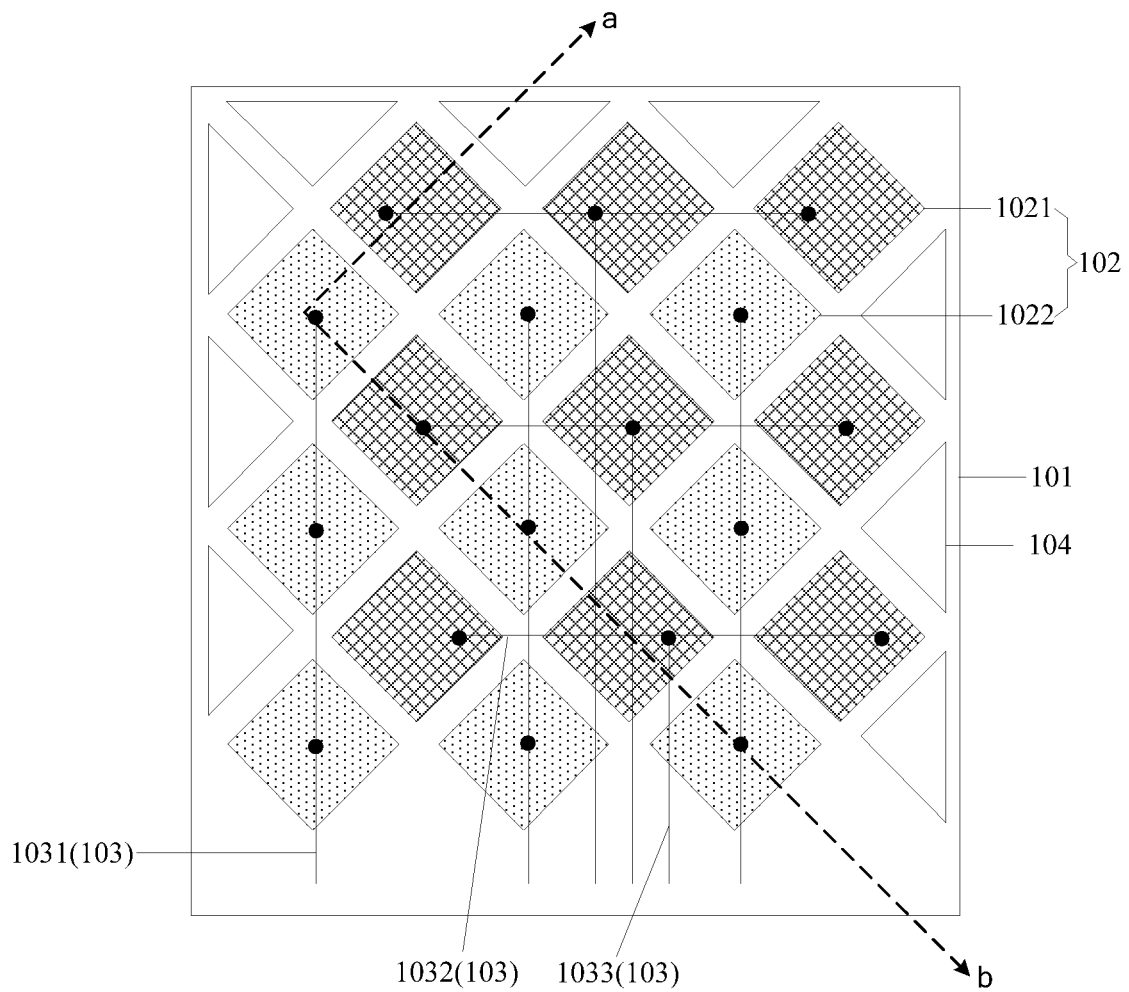

In a fifth possible implementation as illustrated in FIG. 6, each row of first touch electrodes 1021 are connected with one same second wire 1032 extending in the row direction, and then connected with one same third wire 1033 extending in the column direction; and each column of second touch electrodes 1022 are connected with one same first wire 1031 extending in the column direction.

It shall be noted that, the first wires 1031 and the third wires 1033 are connected respectively with touch pins in the touch chip in a one-to-one manner in a practical implementation.

Figure 7:
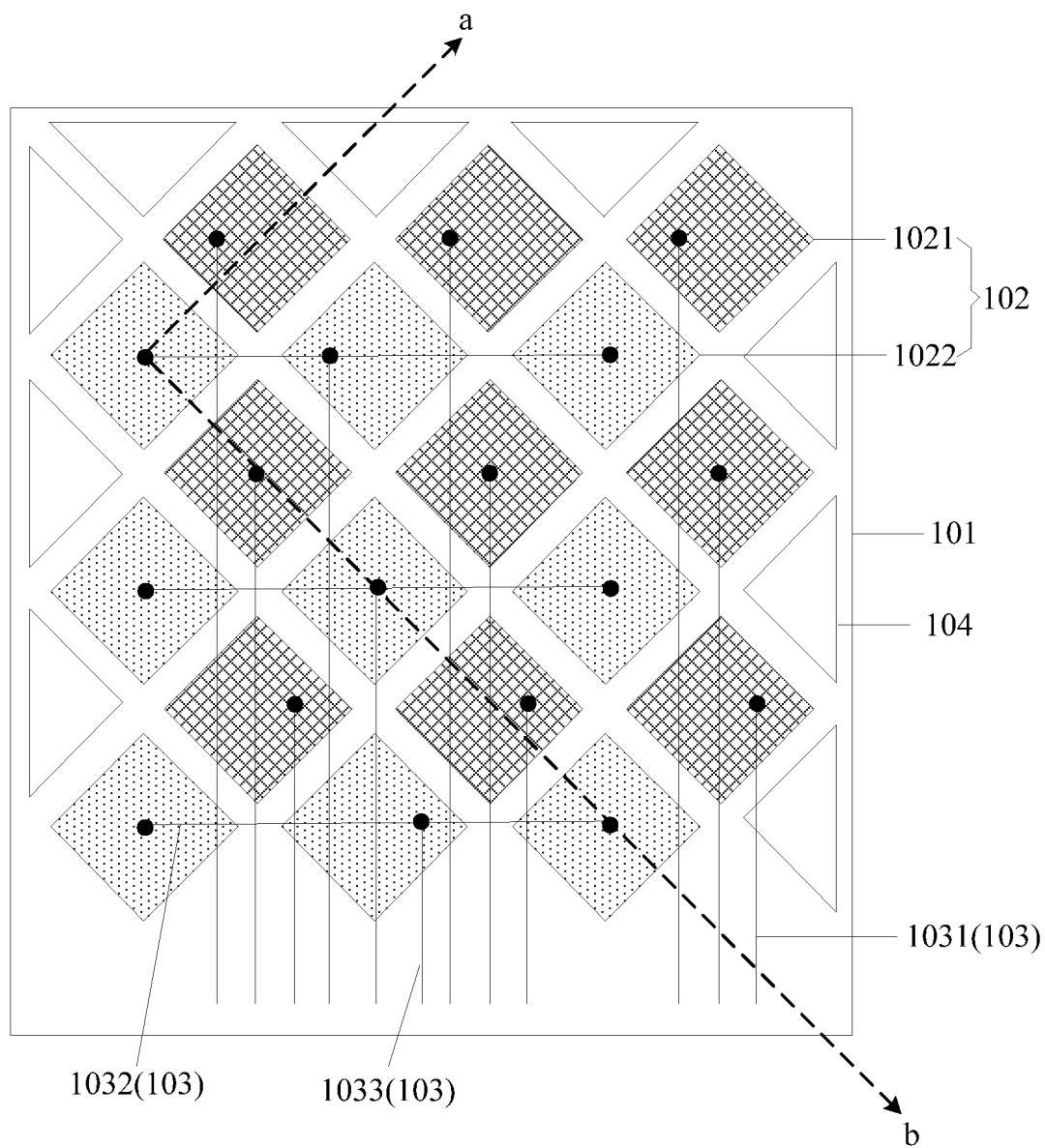
Figure 8:
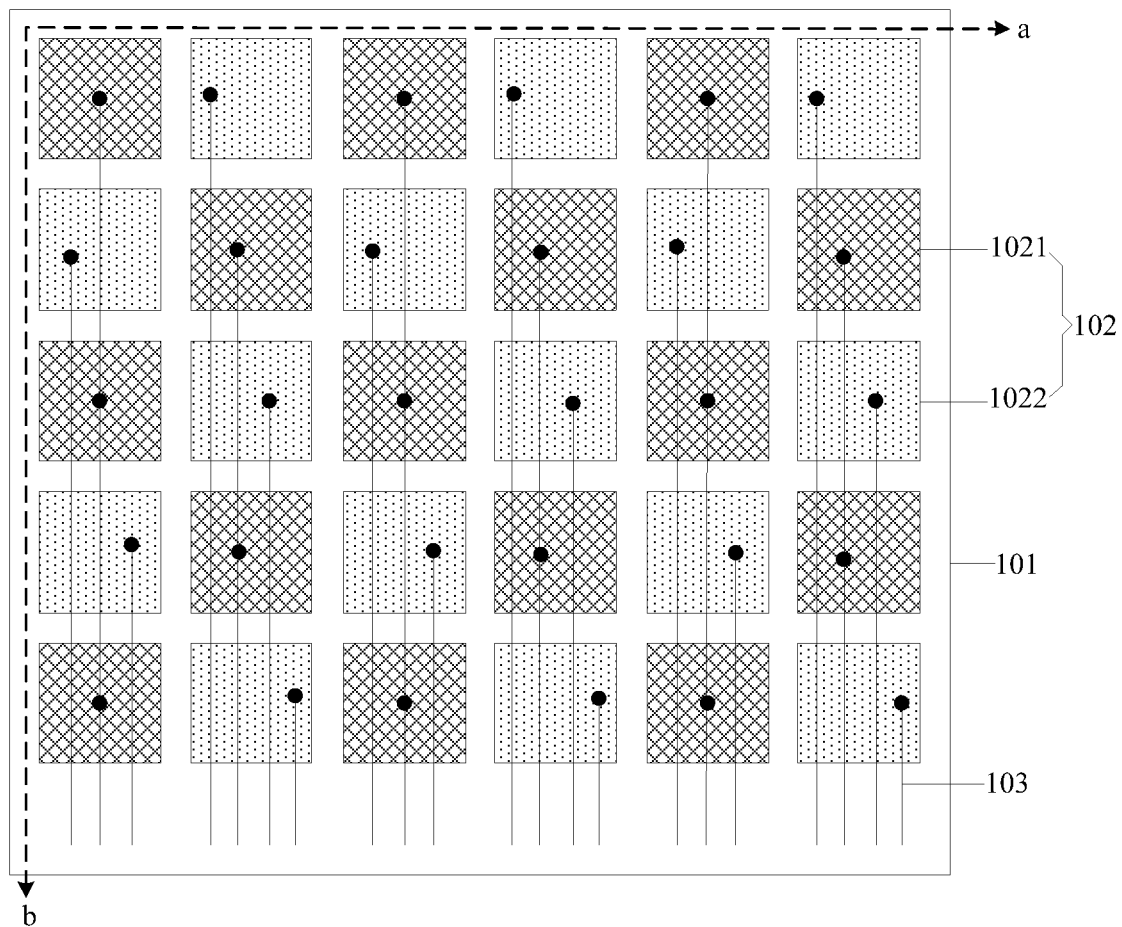
FIG. 8 to FIG. 14 are other schematic structural diagrams respectively of a touch substrate according to the embodiments of the disclosure.
Figure 9:
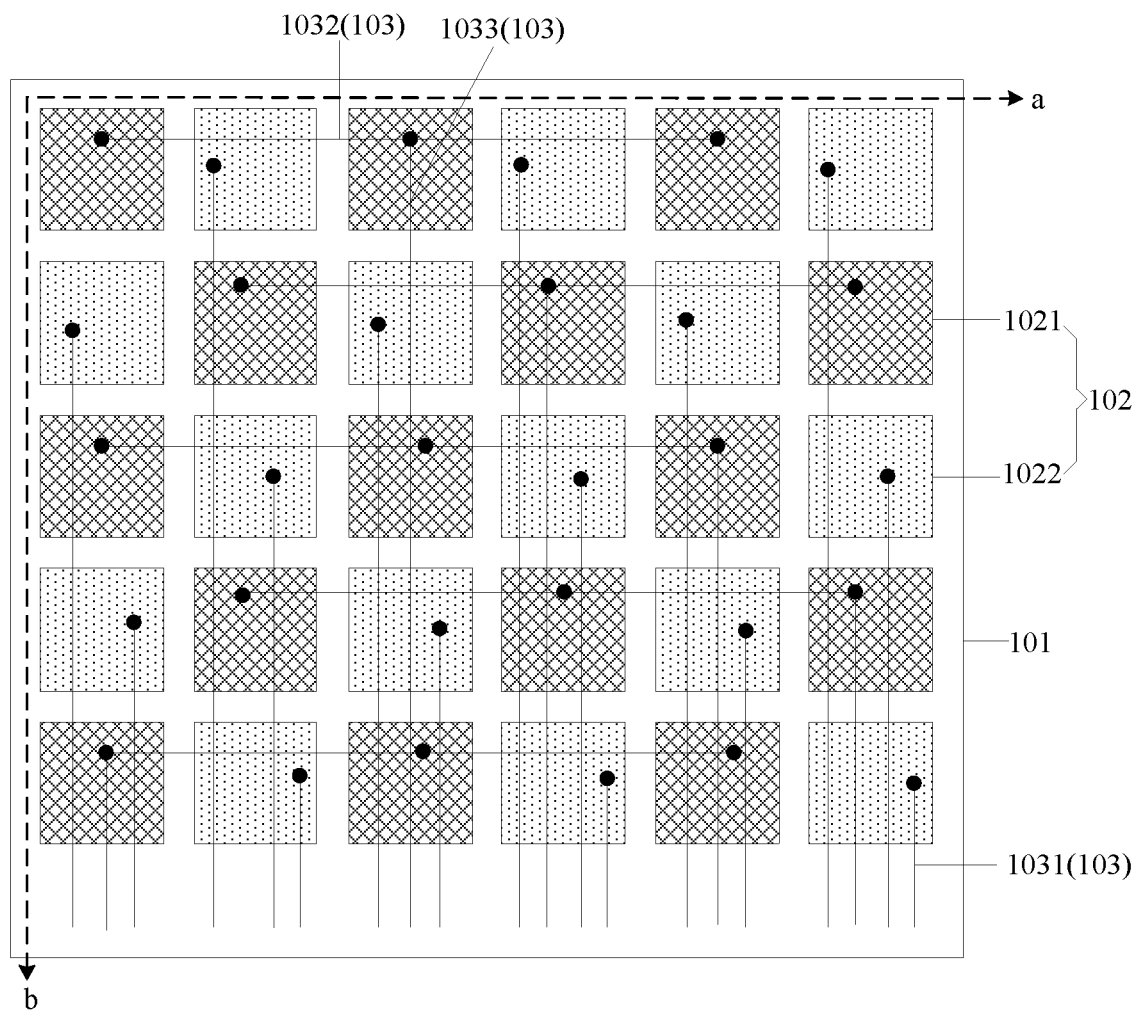
Figure 10:
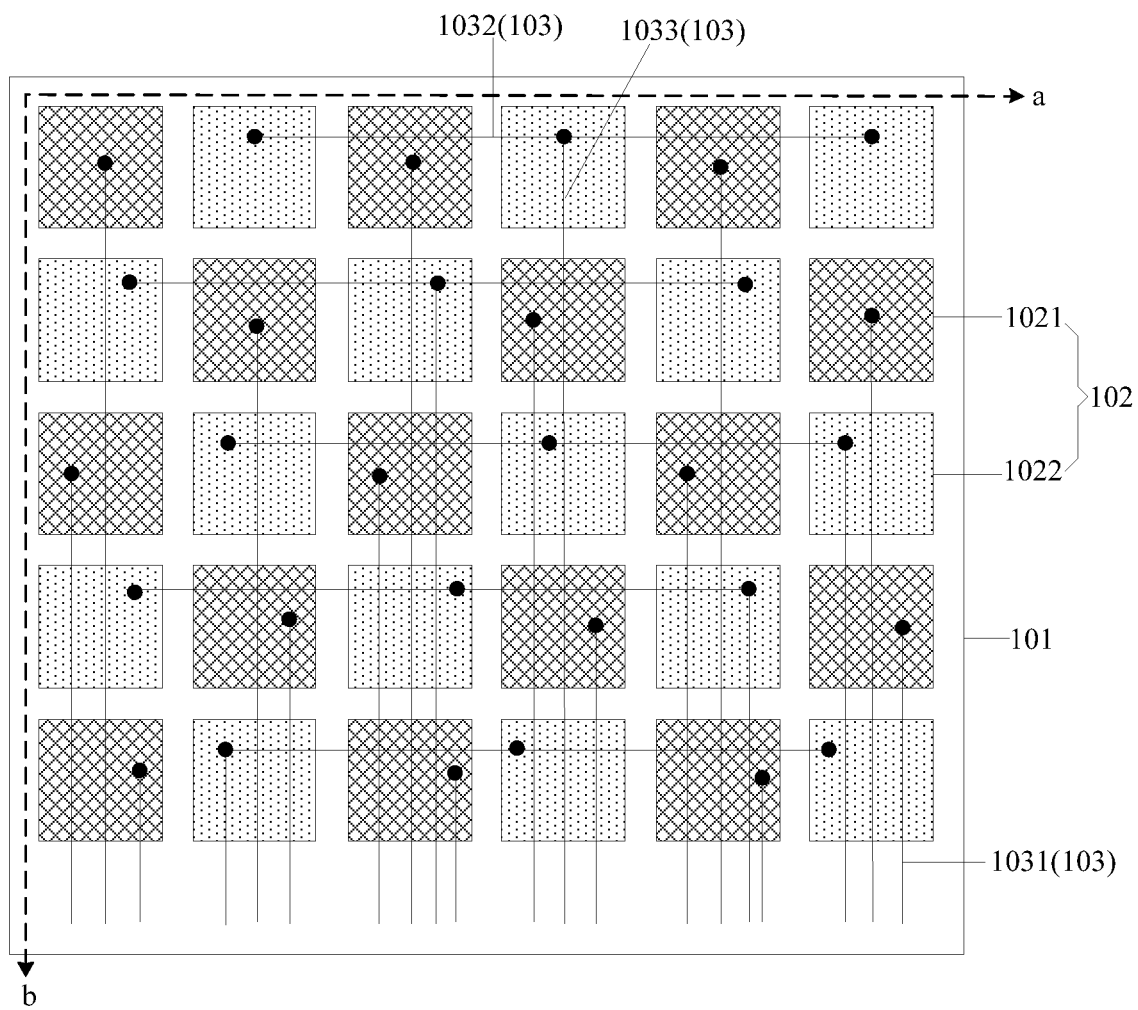
Figure 11:
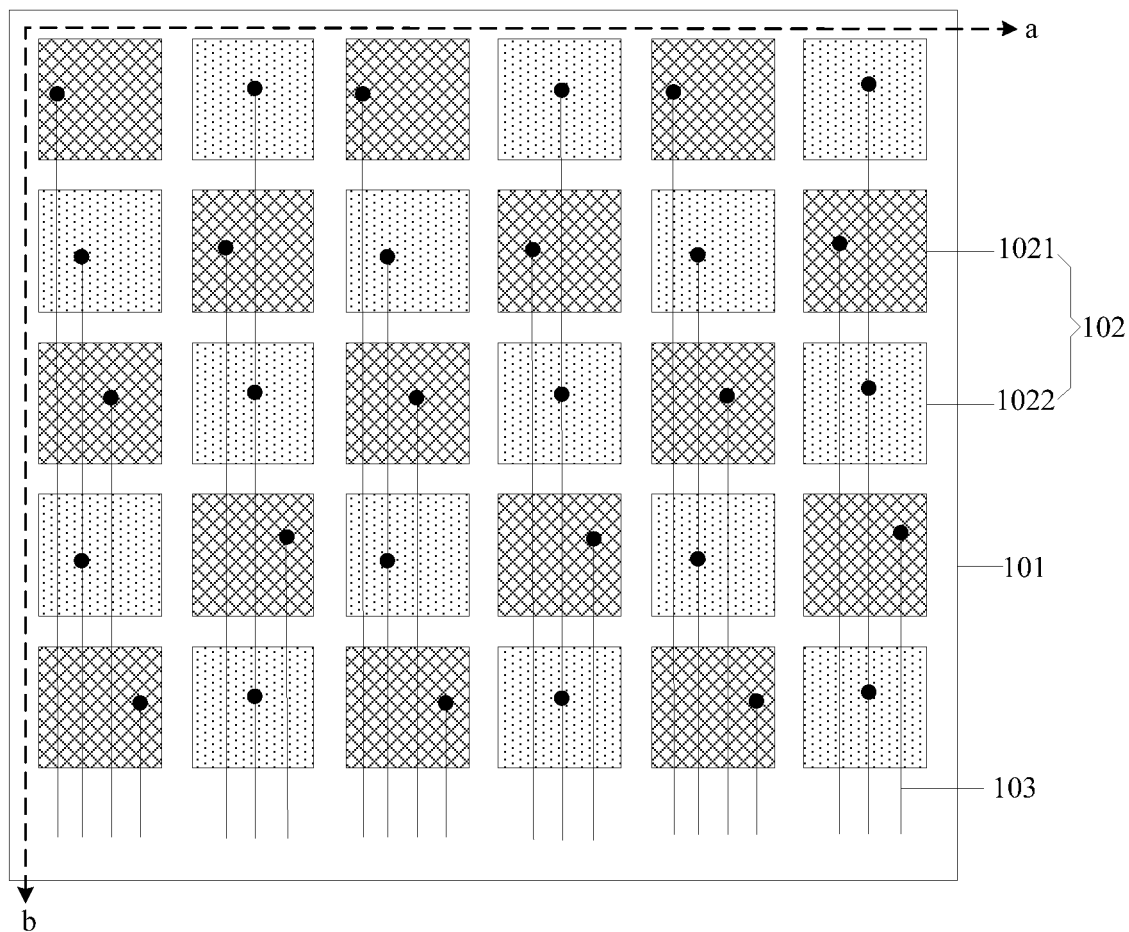
Figure 12:
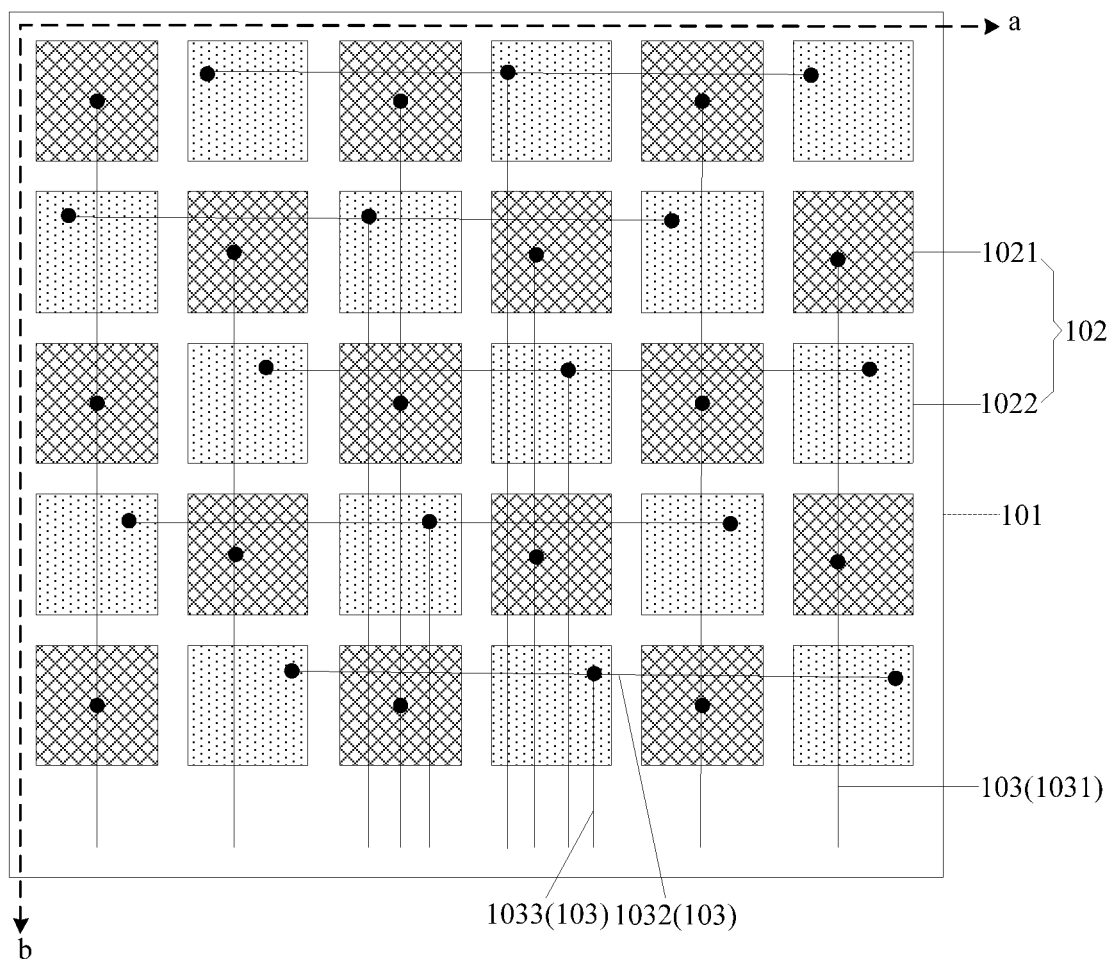
Figure 13:
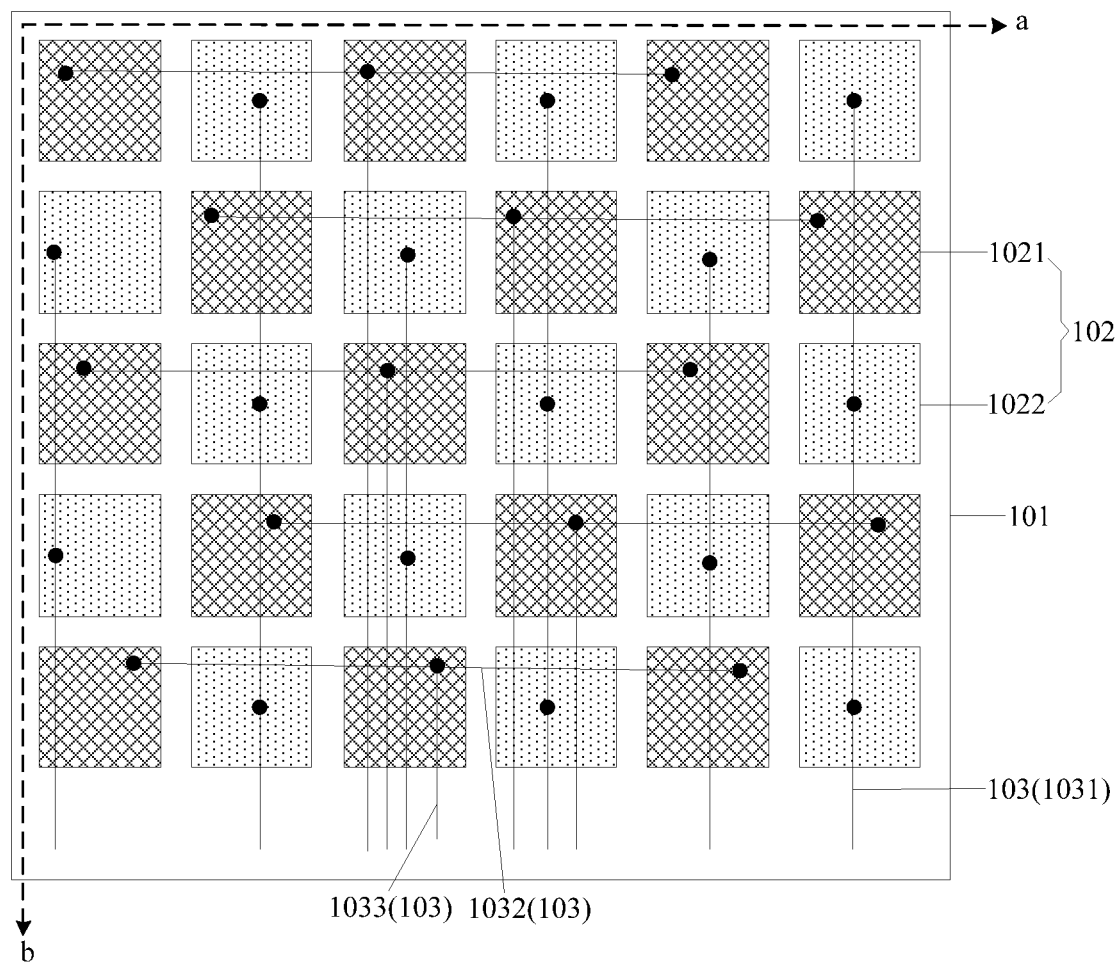
Figure 14:
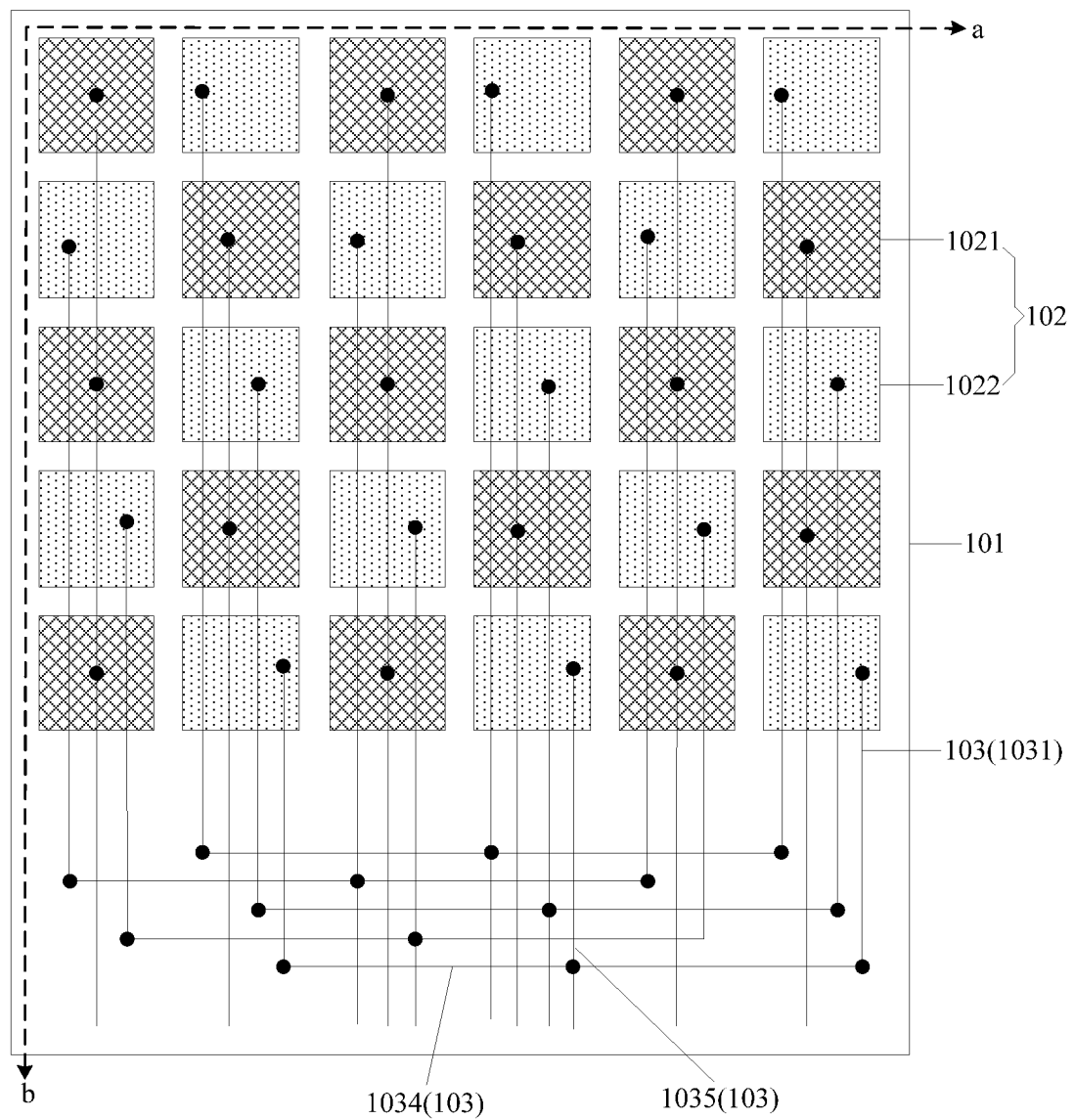

In a sixth possible implementation as illustrated in FIG. 7, each column of first touch electrodes 1021 are connected with first wires 1031 extending in the column direction in a one-to-one manner; and each row of second touch electrodes 1022 are connected with one same second wire 1032 extending in the row direction, and then connected with one same third wire 1033 extending in the column direction.

It shall be noted that, the first wires 1031 and the third wires 1033 are connected respectively with touch pins in the touch chip in a one-to-one manner in a practical implementation.

Figure 18:
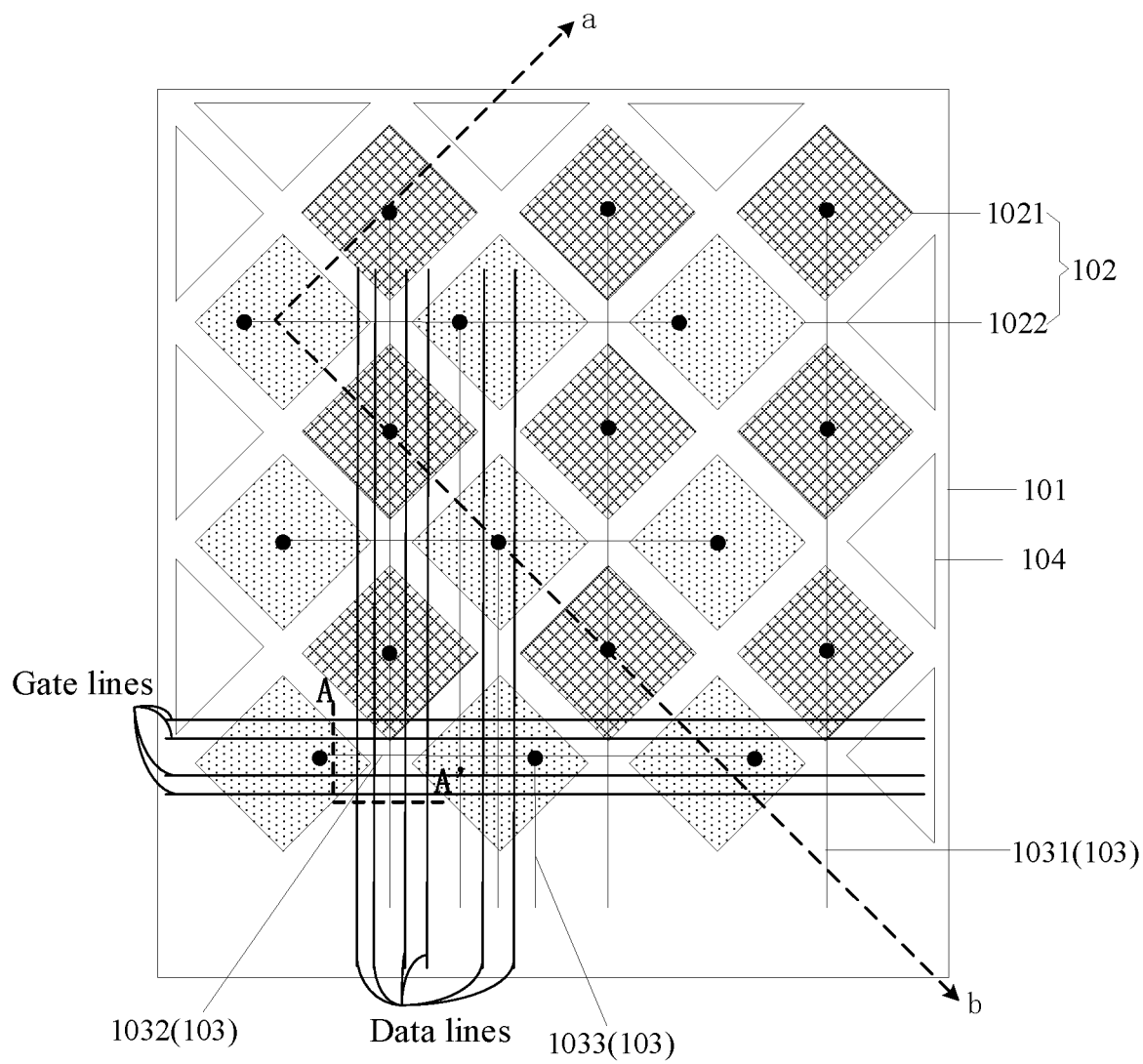
FIG. 18 is a schematic structural diagram of a touch substrate including gate lines and data lines according to the embodiments of the disclosure.
Figure 20:
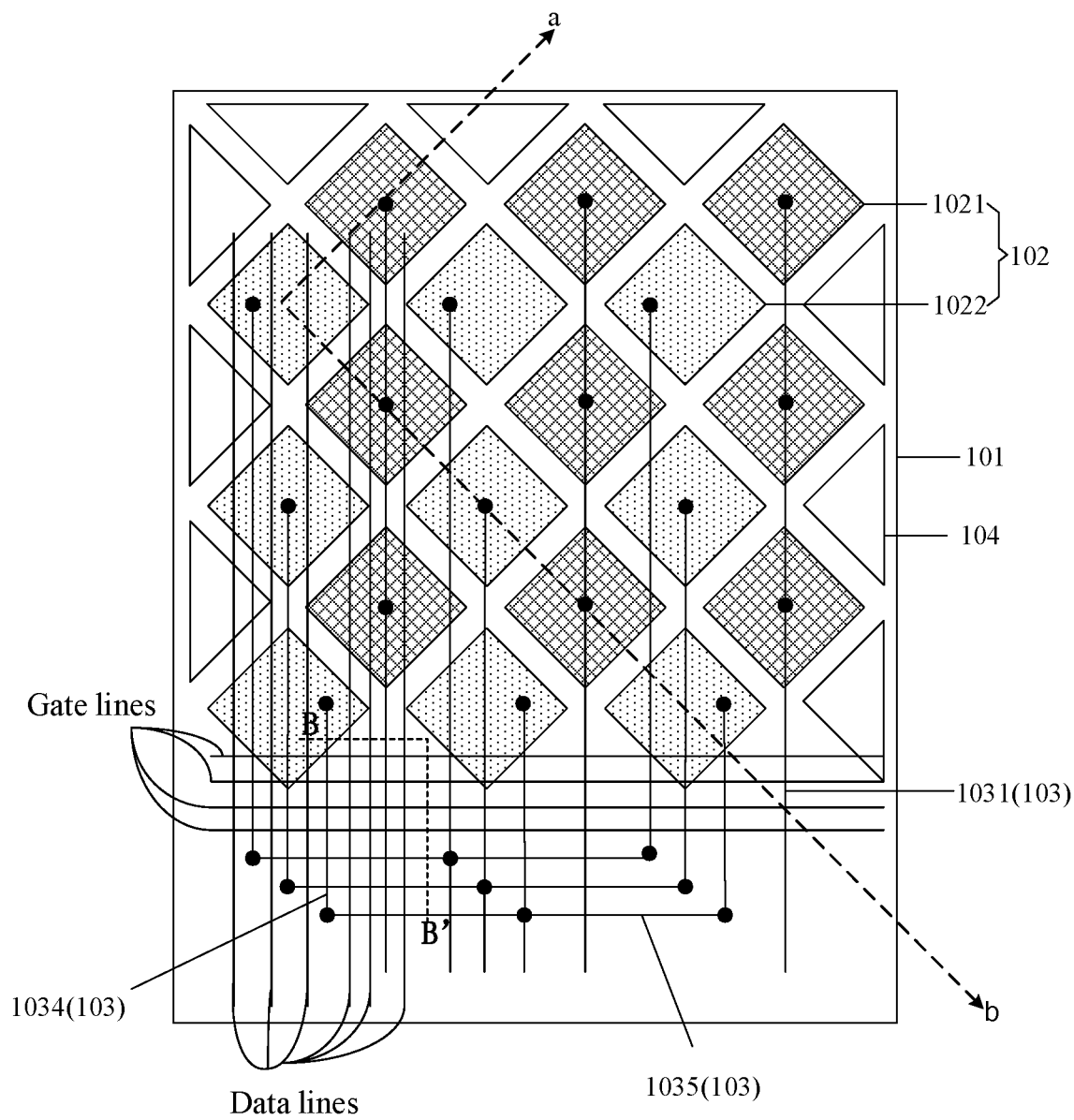
FIG. 20 is another schematic structural diagram of a touch substrate including gate lines and data lines according to the embodiments of the disclosure.
Figure 21:
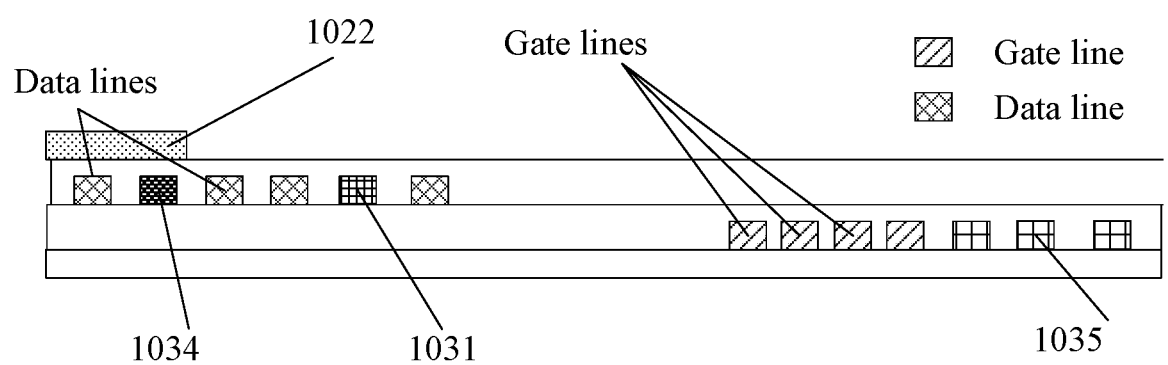
FIG. 21 is a cross-sectional diagram along line B-B' in FIG. 21.

In some embodiments, in the touch substrate above according to the embodiments of the disclosure, as shown in FIGS. 18 and 20, the touch substrate further includes gate lines and data lines arranged intersecting with and insulated from each other, and generally the gate lines extend in the row direction, and the data lines extend in the column direction. In order to simplify a fabrication process, and to make a lightweight and thinned design, the wires 103 extending in the column direction, e.g., the first wires 1031, the third wires 1033, and the fourth wires 1034, can be arranged at the same layer as the data lines; and the wires 103 extending in the row direction, e.g., the second wires 1032 and the fifth wires 1035, can be arranged at the same layer as the gate lines.

Of course, in a practical implementation, the first wires 031, the third wires 1033, and the fourth wires 1034 extending in the column direction can be arranged at a separate layer, and the second wires 1032 and the fifth wires 1035 extending in the row direction can be arranged at another separate layer, although the embodiments of the disclosure will not be limited thereto.

It shall be noted that, the wires 103 in both FIG. 1 and FIG. 4 only extend in the column direction, and do not overlap with each other, so the wires 103 can be routed at a single layer, and when the wires 103 are arranged at the same layer as the data lines, the thickness of the product can be further reduced.

Figure 19:
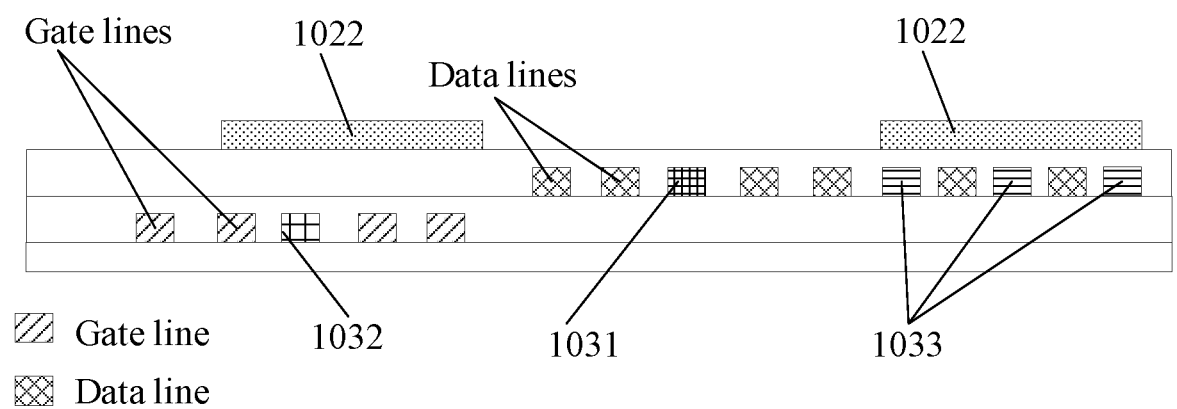
FIG. 19 is a cross-sectional diagram along line A-A' in FIG. 18.

In some embodiments, the material of the gate lines is generally metal, and when the second wires 1032 are arranged at the same layer as the gate lines as shown in FIG. 19, the material of the second wires 1032 is also metal; and as illustrated in FIG. 2, FIG. 5, FIG. 6, and FIG. 7, in order to improve an aperture ratio of a pixel, the second wires 1032 can alternatively be made of Indium Tin Oxide (ITO), Indium Zinc Oxide (IZO), or another transparent material in a practical implementation.

As can be appreciated that when the second wires 1032 are arranged at the same layer as the touch electrodes 102, and one second wire 1032 is connected with one row of second touch electrodes 1022, for example, since the second wires 1032 and their corresponding rows of second touch electrodes 1022 are formed at the same time, they are connected with their corresponding rows of second touch electrodes 1022 after both of them are fabricated, so only the second wires 1022 need to be subsequently connected with the third wires 103. In some embodiments, a second wire 1032 can be connected with a third wire 1033 by punching any one of second touch electrodes 1022 in a row corresponding to the second wire 1032.

In some embodiments, in the touch substrate above according to the embodiments of the disclosure, as illustrated in FIG. 1 to FIG. 7, the touch electrodes 102 are electrically connected with the wires 103 through connection points (solid circles in black as illustrated). In a practical implementation, each touch electrode 102 is connected with a corresponding wire 103 through at least one connection point, and when each touch electrode 102 corresponds to a plurality of connection points, the touch electrode 102 is equivalently connected in parallel with a plurality of wire segments to thereby lower effectively a resistance of the touch electrode 102 so as to improve the precision of touch detection.

In some embodiments, as can be apparent from FIG. 1 to FIG. 7, in the touch substrate above according to the embodiments of the disclosure, a shape of each touch electrode 102 is a diamond with diagonals extending respectively in the row direction and the column direction, and the first direction a and the second direction b are extension directions of two adjacent sides of the diamond.

For the touch electrodes 102 structured in the shape of a diamond, as illustrated in FIG. 1 to FIG. 7, there is some blank area, in which it is not easy to arrange any touch electrode 102, around an area where the touch electrodes are located, and when there is a touch in the blank area, a touch operation cannot be detected effectively, so in order to guarantee the precision of touch detection, a compensation electrode 104 is arranged in the blank area to sense a touch in the blank area in the embodiments of the disclosure. And in a practical implementation, the compensation electrode 104 can be in a shape of a triangle matching with the touch electrodes 102, or of course, can be in another shape, although the embodiments of the disclosure will not be limited thereto.

In some embodiments, as illustrated in FIG. 8 to FIG. 14, in the touch substrate according to the embodiments of the disclosure, the shapes of the touch electrodes 102, and the directions in which the first touch electrodes 1021 and the second touch electrodes 1022 are alternately arranged can be other shapes or directions, for example, the shapes of the touch electrodes 102 can alternatively be squares with two adjacent sides extending respectively in the row direction and the column direction; and the first touch electrodes 1021 and the second touch electrodes 1022 can be alternately arranged in the first direction which is the row direction, and the second direction which is the column direction.

It shall be noted that, the touch substrate as illustrated in FIG. 8 to FIG. 14 is different from the touch substrate as illustrated in FIG. 1 to FIG. 7 only in the shapes of the touch electrodes 102, and the directions in which the first touch electrodes 1021 and the second touch electrodes 1022 are alternately arranged, so only the differences between the touch substrate as illustrated in FIG. 8 to FIG. 14 and the touch substrate as illustrated in FIG. 1 to FIG. 7 will be described below, and a repeated description of the touch substrate will be omitted here.

Figure 15:
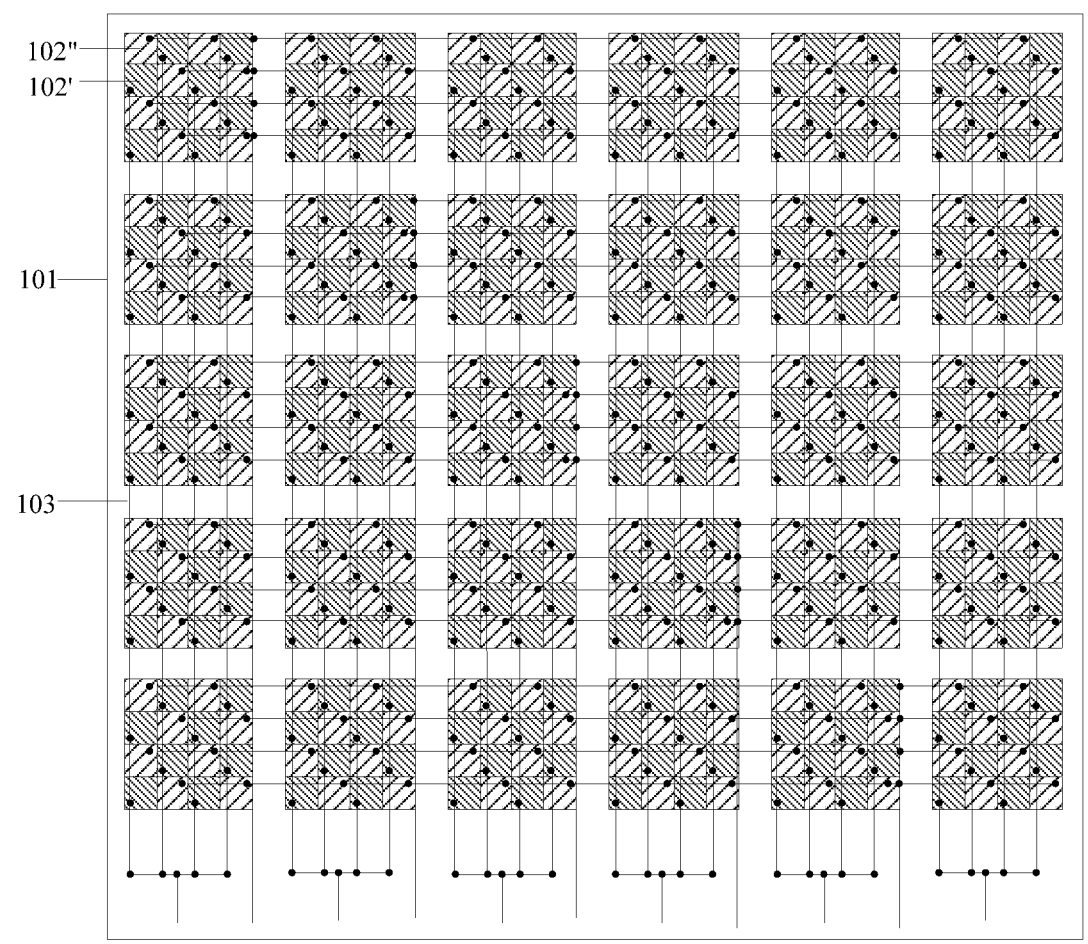
FIG. 15 and FIG. 16 are other schematic structural diagrams respectively of a touch substrate according to the embodiments of the disclosure.
Figure 16:
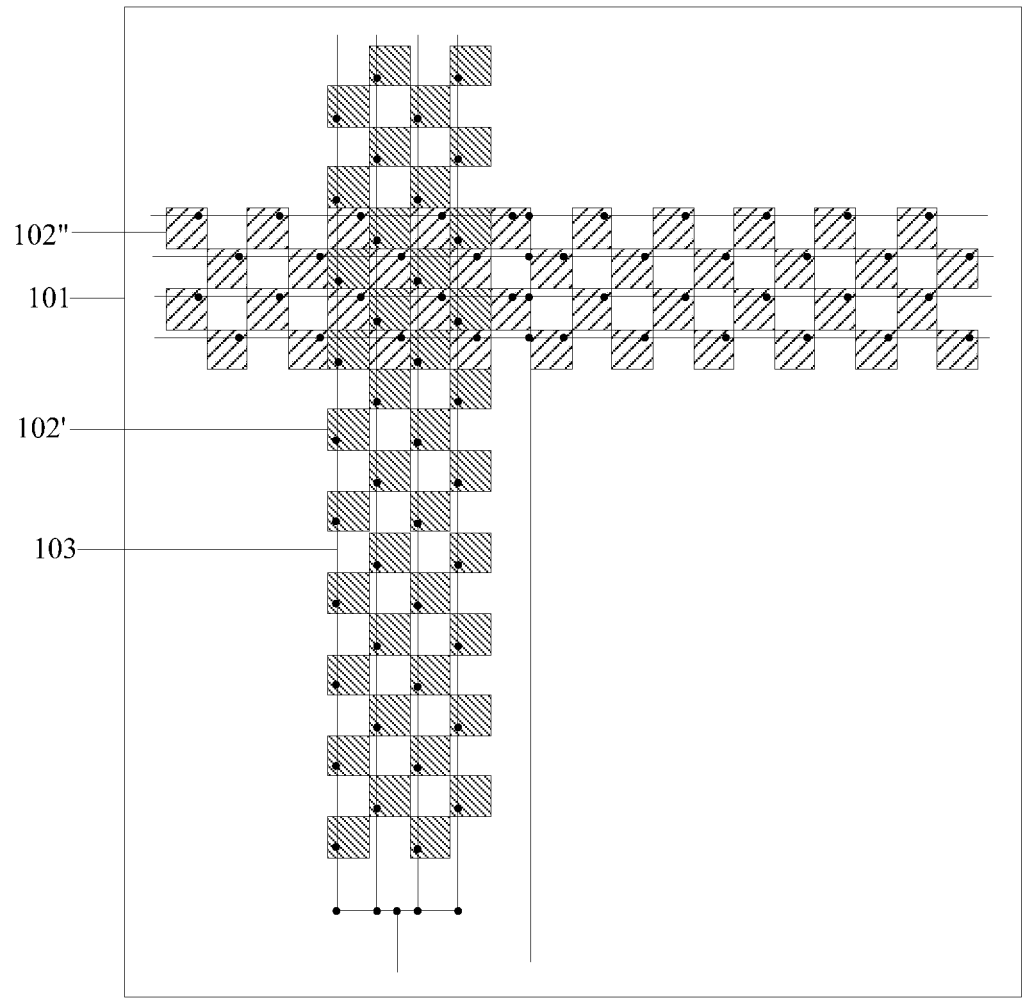

In some embodiments, in the touch substrate above according to the embodiments of the disclosure, as illustrated in FIG. 15 and FIG. 16, each first touch electrode 1021 includes a plurality of first sub-touch electrodes 102', the plurality of first sub-touch electrodes 102' in a same first touch electrode 1021 are electrically connected with each other, and first sub-touch electrodes 102' in each column of first touch electrodes 1021 are electrically connected with each other through wires 103; each second touch electrode 1022 includes a plurality of second sub-touch electrodes 102", the plurality of second sub-touch electrodes 102" in a same second touch electrode 1022 are electrically connected with each other, and second sub-touch electrodes 102" in each row of second touch electrodes 1022 are electrically connected with each other through wires 103; and respective first sub-touch electrodes 102' and respective second sub-touch electrodes 102" are alternately arranged in both the row direction and the column direction.

Here, FIG. 16 only illustrates an instance in which the first sub-touch electrodes 102' and the second sub-touch electrodes 102" are alternately arranged in the row direction and the column direction at an intersection of one row and one column.

In the touch substrate above according to the embodiments of the disclosure, each first touch electrode 1021 is divided into a plurality of first sub-touch electrodes 102', and each second touch electrode 1022 is divided into a plurality of second sub-touch electrodes 102", so that lengths of perimeters of a single first touch electrode 1021 and a single second touch electrode 1022 can be increased; and further, the first sub-touch electrodes 102' and the second sub-touch electrodes 102" are alternately arranged in both the row direction and the column direction, thereby a mutual capacitance between adjacent first and second touch electrodes 1021 and 1022 can be increased so as to improve a touch effect.

With a first touch electrode 1021 of 4 mm*4 mm, for example, the length of the perimeter thereof is 4 mm*4=16 mm, and the first touch electrode 1021 can include four, six, or eight first sub-touch electrodes 102'. When it is segmented into eight first sub-touch electrodes 102' of 1 mm*1 mm, the sum of the lengths of the perimeters of the eight first sub-touch electrodes 102 is 1 mm*4*8=32 mm, so the length of the perimeter is greatly increased as can be apparent from the comparison. Alike, a second touch electrode 1022 can also include four, six, or eight second sub-touch electrodes 102". When the second touch electrode 1022 of 4 mm*4 mm is segmented into eight second sub-touch electrodes 102" of 1 mm*1 mm, the sum of the lengths of the perimeters of the second sub-touch electrodes 102" is 1 mm*4*8=32 mm, which is larger than the length of the perimeter, 4 mm*4=16, of the single second touch electrode 1022. When the eight first sub-touch electrodes 102' and the eight second sub-touch electrodes 102" are alternately arranged in both the row direction and the column direction, a total mutual capacitance between the first sub-touch electrodes 102' and the second sub-touch electrodes 102" is larger than a total mutual capacitance between the first touch electrode 1021 and the second touch electrode 1022 of 4 mm*4 mm, thus improving a touch effect.

As can be apparent, in the touch substrate above according to the embodiments of the disclosure, only if a first touch electrode 1021 is segmented into at least two first sub-touch electrodes 102', a second touch electrode 1022 is segmented into at least two second sub-touch electrodes 102", and the first sub-touch electrodes 102' and the second sub-touch electrodes 102' are alternately arranged in the row direction and the column direction, then the lengths of the perimeters of the first touch electrode 1021 and the second touch electrode 1022 will be increased to thereby improve a touch effect; and the shapes of the sub-touch electrodes into which they are segmented will not be limited to any particular shapes, but will be determined as needed in reality.

Figure 17:
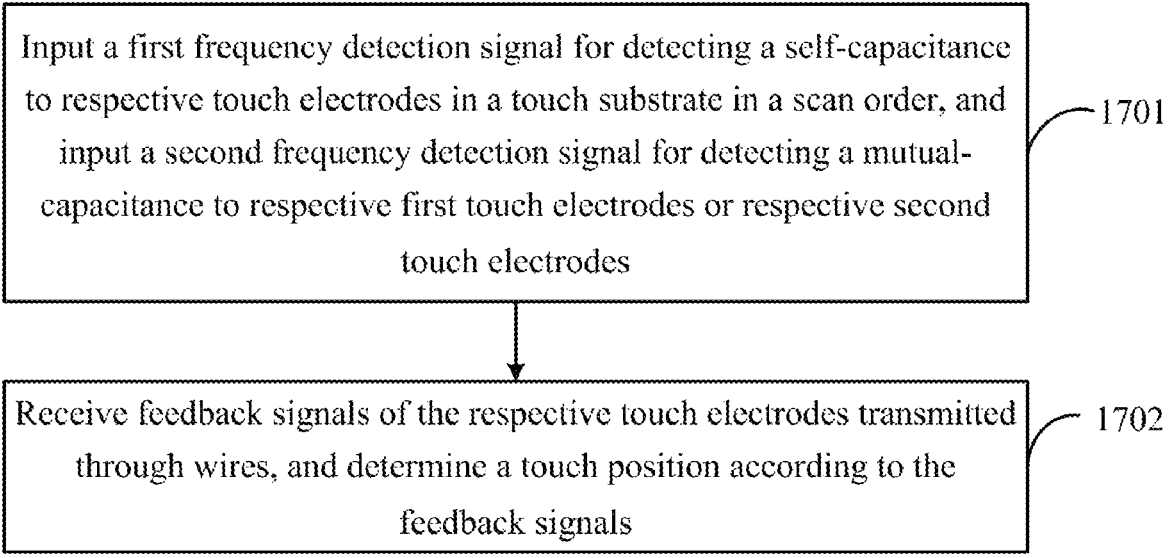
FIG. 17 is a flow chart of a method for positioning a touch in a touch substrate according to the embodiments of the disclosure.

Based upon the same inventive concept, the embodiments of the disclosure further provide a method for positioning a touch, and as illustrated in FIG. 17, the method includes the following operations.

The operation S1701 is to input a first frequency detection signal for detecting a self-capacitance to respective touch electrodes in a touch substrate in a scan order, and to input a second frequency detection signal for detecting a mutual-capacitance to respective first touch electrodes or respective second touch electrodes.

In some embodiments, when the first frequency detection signal for detecting a self-capacitance is input to the respective touch electrodes, the respective touch electrodes are self-capacitance electrodes; when the second frequency detection signal for detecting a mutual-capacitance is input to the respective first touch electrodes, the respective first touch electrodes are touch drive electrodes, and the respective second touch electrodes are touch sense electrodes; and when the second frequency detection signal for detecting a mutual-capacitance is input to the respective second touch electrodes, the respective second touch electrodes are touch drive electrodes, and the respective first touch electrodes are touch sense electrodes.

The operation S1702 is to receive feedback signals of the respective touch electrodes transmitted through wires, and to determine a touch position according to the feedback signals.

In some embodiments, self-capacitances and mutual-capacitances of the respective touch electrodes can be determined firstly by demodulating the feedback signals; and when the first touch electrodes include first sub-touch electrodes, and the second touch electrodes include second sub-touch electrodes, self-capacitances and mutual-capacitances of respective first sub-touch electrodes and respective second sub-touch electrodes need to be determined respectively.

Furthermore, since both the first frequency detection signal for detecting a self-capacitance, and the second frequency detection signal for detecting a mutual-capacitance are applied to the touch electrodes in the embodiments of the disclosure, each of the signals fed back by the respective touch electrodes to a touch detection chip is characterized as a coupled signal of the self-capacitance and the mutual-capacitance, and the coupled signal is demodulated into a feedback signal corresponding to the first frequency detection signal, and a feedback signal corresponding to the second frequency detection signal. Furthermore, the self-capacitances and the mutual-capacitances of the respective touch electrodes are determined according to a connection relationship between the wires and the touch electrodes, and the feedback signal corresponding to the first frequency detection signal, and the feedback signal corresponding to the second frequency detection signal. Where, the coupled signal can be demodulated in a same way as in the related art, so a repeated description thereof will be omitted here.

Thereafter, the self-capacitances of the touch electrodes at respective positions are compared with a first preset capacitance, and the mutual-capacitances thereof are compared with a second preset capacitance; and when the first touch electrodes include first sub-touch electrodes, and the second touch electrodes include second sub-touch electrodes, the determined self-capacitances of the respective first sub-touch electrodes and the respective second sub-touch electrodes are compared with the first preset capacitance, and the mutual-capacitances thereof are compared with the second preset capacitance.

Finally, a position of a touch electrode with a self-capacitance greater than the first preset capacitance, and a mutual-capacitance lower than the second preset capacitance is determined as a touch position; and in some embodiments, when the first touch electrodes include first sub-touch electrodes, and the second touch electrodes include second sub-touch electrodes, an area including a first touch electrode corresponding to a first sub-touch electrode with a self-capacitance greater than the first preset capacitance, and a mutual-capacitance lower than the second preset capacitance, or an area including a second touch electrode corresponding to a second sub-touch electrode with a self-capacitance greater than the first preset capacitance, and a mutual-capacitance lower than the second preset capacitance is determined as a touch position.

Based upon the same inventive concept, the embodiments of the disclosure further provide a capacitive touch screen including the touch substrate above according to the embodiments of the disclosure, and the capacitive touch screen can be a mobile phone, a tablet computer, a TV set, a monitor, a notebook computer, a digital camera, a navigator, a smart watch, a fitness wrist band, a personal digital assistant, an automatic teller machine, or any other product or component with a display function. All the other components indispensable to the capacitive touch screen shall readily occur to those skilled in the art, so a repeated description thereof will be omitted here, and the embodiments of the disclosure will not be limited thereto. Further, reference can be made to the embodiments of the touch substrate above for an implementation of the capacitive touch screen, and a repeated description thereof will be omitted here.

It shall be noted that in this context, the relationship terms, e.g., "first", "second", etc., are only intended to distinguish one entity or operation from another entity or operation, but not intended to require or suggest any such real relationship or order between these entities or operations.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A touch substrate, comprising:
a base substrate;
a plurality of touch electrodes, arranged in a single layer and separated from each other on the base substrate; and
gate lines and data lines arranged intersecting with and insulated from each other;
wherein the plurality of touch electrodes comprise first touch electrodes and second touch electrodes, arranged alternately in both a first direction and a second direction;
respective first touch electrodes in each of at least one row or column of the plurality of touch electrodes are connected through one same wire, or respective second touch electrodes in each of at least one row or column of the plurality of touch electrodes are connected through one same wire;
respective first touch electrodes in each column of the plurality of touch electrodes are connected with one same first wire extending in a column direction;
respective second touch electrodes in each row of the plurality of touch electrodes are connected with one same second wire extending in a row direction, and further connected with one same third wire extending in the column direction subsequently; and
both the first wire and the third wire are arranged at a same layer as the data lines, and the second wire is arranged at a same layer as the gate lines.

2. The touch substrate according to claim 1, wherein respective first touch electrodes in each row of the plurality of touch electrodes are connected with one same second wire extending in a row direction, and further connected with one same third wire extending in a column direction subsequently; and respective second touch electrodes in each row of the plurality of touch electrodes are connected respectively with first wires extending in the column direction in a one-to-one manner.

3. The touch substrate according to claim 1, wherein respective first touch electrodes in each row of the plurality of touch electrodes are connected with one same second wire extending in a row direction, and further connected with one same third wire extending in a column direction subsequently; and respective second touch electrodes in each column of the plurality of touch electrodes are connected with one same first wire extending in the column direction.

4. The touch substrate according to claim 1, wherein respective first touch electrodes in each column of the plurality of touch electrodes are connected respectively with first wires extending in a column direction in a one-to-one manner; and respective second touch electrodes in each row of the plurality of touch electrodes are connected with one same second wire extending in a row direction, and further connected with one same third wire extending in the column direction subsequently.

5. The touch substrate according to claim 1, wherein each of the plurality of touch electrodes is connected with a corresponding wire through at least one connection point.

6. The touch substrate according to claim 1, wherein each of the plurality of touch electrodes is in a shape of a diamond with diagonals extending respectively in a row direction and a column direction, and the first direction and the second direction are extension directions of two adjacent sides of the diamond.

7. The touch substrate according to claim 1, wherein the touch substrate comprises a blank area around an area where the plurality of touch electrodes are located; and a compensation electrode is arranged in the blank area to sense a touch in the blank area.

8. The touch substrate according to claim 7, wherein the compensation electrode is in a shape of a triangle matching with the plurality of touch electrodes.

9. The touch substrate according to claim 1, wherein each of the plurality of touch electrodes is in a shape of a square with two adjacent sides extending respectively in a row direction and a column direction, and the first direction and the second direction in which the first touch electrodes and the second touch electrodes are alternately arranged are the row direction and the column direction, respectively.

10. The touch substrate according to claim 1, wherein each first touch electrode comprises a plurality of first sub-touch electrodes electrically connected with each other;

each second touch electrode comprises a plurality of second sub-touch electrodes electrically connected with each other; and the plurality of first sub-touch electrodes and the plurality of second sub-touch electrodes are arranged alternately in both a row direction and a column direction.

11. The touch substrate according to claim 10, wherein shapes of each of the plurality of first sub-touch electrodes and each of the plurality of second sub-touch electrodes are squares of 1 mm*1 mm.

12. A capacitive touch screen, comprising the touch substrate according to claim 1.

13. A method for positioning a touch in the touch substrate according to claim 1, the method comprising:

inputting a first frequency detection signal for detecting a self-capacitance to respective touch electrodes in the touch substrate in a scan order, and inputting a second frequency detection signal for detecting a mutual-capacitance to respective first touch electrodes or respective second touch electrodes; and receiving feedback signals of the respective touch electrodes transmitted through wires, and determining a touch position according to the feedback signals.

14. The method for positioning the touch according to claim 13, wherein determining the touch position according to the feedback signals comprises:

demodulating the feedback signals, and determining self-capacitances and mutual-capacitances of the respective touch electrodes;

comparing the self-capacitances of the respective touch electrodes at respective positions with a first preset capacitance, and the mutual-capacitances thereof with a second preset capacitance; and determining a position of a touch electrode with a self-capacitance greater than the first preset capacitance, and a mutual-capacitance lower than the second preset capacitance as a touch position.

15. The method for positioning the touch according to claim 14, wherein determining the self-capacitances and the mutual-capacitances of the respective touch electrodes comprises:

determining self-capacitances and mutual-capacitances of respective first sub-touch electrodes of the respective first touch electrodes, and respective second sub-touch electrodes of the respective second touch electrodes.

16. The method for positioning the touch according to claim 15, wherein determining the position of the touch electrode with a self-capacitance greater than the first preset capacitance, and a mutual-capacitance lower than the second preset capacitance as the touch position comprises:

determining an area comprising a first touch electrode corresponding to a first sub-touch electrode with a self-capacitance greater than the first preset capacitance, and a mutual-capacitance lower than the second preset capacitance, or an area comprising a second touch electrode corresponding to a second sub-touch electrode with a self-capacitance greater than the first preset capacitance, and a mutual-capacitance lower than the second preset capacitance as the touch position.

17. A touch substrate, comprising:

a base substrate;

a plurality of touch electrodes, arranged in a single layer and separated from each other on the base substrate; and gate lines and data lines arranged intersecting with and insulated from each other;

wherein the plurality of touch electrodes comprise first touch electrodes and second touch electrodes, arranged alternately in both a first direction and a second direction;

respective first touch electrodes in each of at least one row or column of the plurality of touch electrodes are connected through one same wire, or respective second touch electrodes in each of at least one row or column of the plurality of touch electrodes are connected through one same wire;

respective first touch electrodes in each column of the plurality of touch electrodes are connected with one same first wire extending in a column direction;

respective second touch electrodes in each row of the plurality of touch electrodes are connected with fourth wires extending in the column direction in a one-to-one manner, and further connected with one same fifth wire extending in a row direction subsequently; and both the first wire and the fourth wire are arranged at a same layer as the data lines, and the fifth wire is arranged at a same layer as the gate lines.

18. A method for positioning a touch in the touch substrate according to claim 17, the method comprising:

inputting a first frequency detection signal for detecting a self-capacitance to respective touch electrodes in the touch substrate in a scan order, and inputting a second frequency detection signal for detecting a mutual-capacitance to respective first touch electrodes or respective second touch electrodes; and receiving feedback signals of the respective touch electrodes transmitted through wires, and determining a touch position according to the feedback signals.

19. The method for positioning the touch according to claim 18, wherein determining the touch position according to the feedback signals comprises:

demodulating the feedback signals, and determining self-capacitances and mutual-capacitances of the respective touch electrodes;

comparing the self-capacitances of the respective touch electrodes at respective positions with a first preset capacitance, and the mutual-capacitances thereof with a second preset capacitance; and determining a position of a touch electrode with a self-capacitance greater than the first preset capacitance, and a mutual-capacitance lower than the second preset capacitance as a touch position.

20. The method for positioning the touch according to claim 19, wherein determining the self-capacitances and the mutual-capacitances of the respective touch electrodes comprises:

determining self-capacitances and mutual-capacitances of respective first sub-touch electrodes of the respective first touch electrodes, and respective second sub-touch electrodes of the respective second touch electrodes.

* * * * *